United States Patent [19]

Taylor

[11] 4,037,882
[45] July 26, 1977

[54] ANTI-LOCK BRAKE CONTROL CIRCUIT
[75] Inventor: David W. Taylor, Davison, Mich.
[73] Assignee: General Motors Corporation, Detroit, Mich.
[21] Appl. No.: 633,674
[22] Filed: Nov. 20, 1975
[51] Int. Cl.² .............................................. B60T 8/10
[52] U.S. Cl. ...................................... 303/107; 303/97; 303/105
[58] Field of Search ....................... 188/181 A, 181 C; 303/97, 105–107; 317/5; 324/162; 340/53, 62

[56] References Cited
U.S. PATENT DOCUMENTS

| | | | |
|---|---|---|---|
| 3,523,712 | 8/1970 | Leiber | 303/97 |
| 3,578,819 | 5/1971 | Atkins | 303/106 |
| 3,604,761 | 9/1971 | Okamoto et al. | 303/97 |
| 3,640,588 | 2/1972 | Carp et al. | 303/106 |
| 3,709,567 | 1/1973 | Van Ostrom et al. | 303/107 |
| 3,756,662 | 9/1973 | Kuwana | 303/106 |
| 3,758,166 | 9/1973 | Kuwana et al. | 303/106 |
| 3,870,376 | 3/1975 | Riordan | 303/106 |
| 3,889,128 | 6/1975 | Luhdorff | 303/97 X |
| 3,922,022 | 11/1975 | Ochiai | 303/106 |

Primary Examiner—Stephen G. Kunin
Attorney, Agent, or Firm—Howard N. Conkey

[57] ABSTRACT

An anti-lock brake control circuit compares the deceleration of a braked wheel with a deceleration reference and integrates the difference when wheel deceleration exceeds the reference deceleration. A resulting velocity error signal is compared with a velocity error reference and a release signal is generated while the velocity error signal exceeds the velocity error reference. Adaptive control is provided by a first order lag circuit having wheel velocity as its input and which supplies a variable portion of the deceleration reference having a slope approximately equal to the slope of the vehicle velocity profile during braking on low coefficient surfaces and having a slope less than the slope of the vehicle velocity profile during braking on high coefficient surfaces. An initial cycle and pulse circuit sets the velocity error reference to a high level for both the first cycle of anti-lock brake operation and for a time period after each brake application during anti-lock brake operation.

3 Claims, 1 Drawing Figure

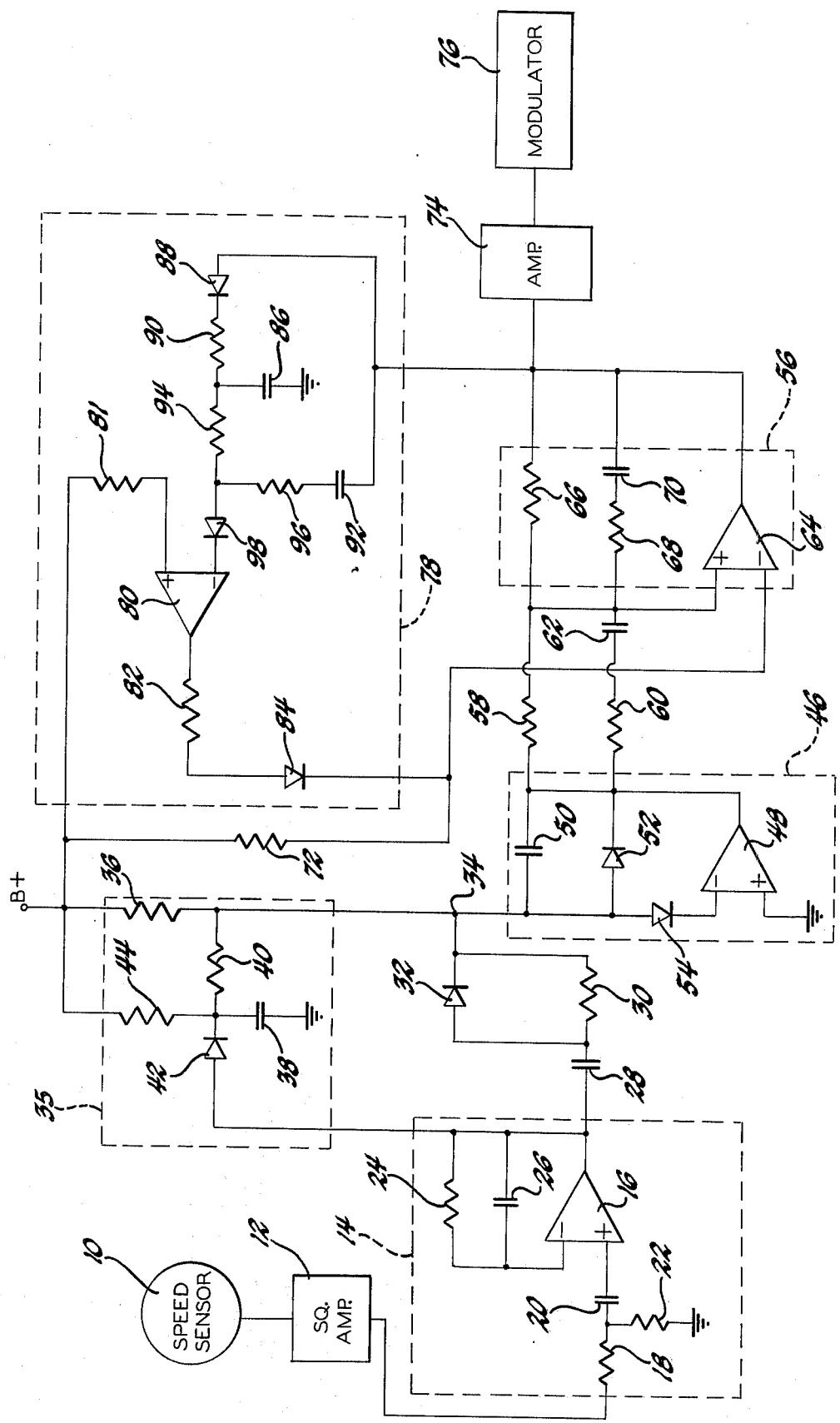

ANTI-LOCK BRAKE CONTROL CIRCUIT

This invention relates to anti-lock control of vehicle brakes.

It has previously been proposed to provide an anti-lock brake control system which is adaptive to various road surface coefficients of friction by providing a reference deceleration to be compared with vehicle wheel deceleration. The reference deceleration is made variable to provide for the adaptive feature. Also, some forms of these anti-lock brake control systems include a release integrator for providing a velocity error signal output representing the magnitude of wheel slip. These systems couple the velocity error signal to a comparator which compares the velocity error signal with a velocity error reference signal and produces a brake release signal while the reference is exceeded. In order to render the system less sensitive to the velocity error signal during the first cycle of anti-lock brake operation to ensure that the wheel is approaching an incipient lockup condition before effecting brake release and further to ensure that wheel speed excursions resulting from axle wrap, which typically follows brake application, does not interfere with proper operation of the brake control system, it has been proposed to provide a first circuit for increasing the velocity error reference prior to each initial cycle of anti-lock brake operation and a second circuit for momentarily increasing the velocity error reference following each brake application during anti-lock brake operation. Although these systems perform their intended function, they are generally complex and costly.

It is one object of this invention to provide a more economical anti-lock brake control system achieved by simplicity of design.

It is another object of this invention to provide an anti-lock brake control system adaptable to various road surface coefficients of friction wherein a deceleration reference is generated which includes a variable portion supplied by a first order lag circuit having a wheel velocity input.

It is another object of this invention to provide an anti-lock brake control system having a single circuit for providing a high velocity error reference signal for both the first cycle of anti-lock brake operation and for a time period following each brake application during anti-lock brake operation.

These and other objects of this invention may be best understood by reference to the following description of a preferred embodiment of the invention and the drawing which is a schematic diagram of the anti-lock brake control system incorporating the principles of this invention.

The following description of a preferred embodiment describes the invention as applied to a single braked wheel on a vehicle although braking control of a greater number of wheels is contemplated by this invention.

Referring to the drawing, a speed sensor 10 monitors the speed of a vehicle wheel and supplies a series of pulses having a frequency directly proportional to the wheel speed. The speed sensor 10 may take the form of any of the well-known speed sensors such as a toothed wheel, variable reluctance, electromagnetic transducer. The output of the speed sensor 10, representing wheel speed, is supplied to a squaring amplifier 12 which supplies a series of square wave pulses at the frequency of the output of the speed sensor 10.

The output of the squaring amplifier 12 is coupled to a frequency-to-voltage converter 14 which provides a direct voltage output having a magnitude representing wheel speed. To provide this direct voltage speed signal, the output of the squaring amplifier 12 is coupled to the positive input of an operational amplifier 16 through a resistor 18 and a differentiating capacitor 20. A resistor 22 is coupled between the junction of the resistor 18 and the capacitor 20 and ground. A feedback circuit comprised of parallel coupled resistor 24 and feedback capacitor 26 is coupled between the output and the negative input of the operational amplifier 16. The value of the resistor 24 calibrates the scale factor of the frequency-to-voltage converter 14 while the capacitor 26 provides filtering. The operational amplifier 16 is of the type which responds only to the positive currents supplied to its positive input and which sources current for discharging the capacitor 20.

In operation of the frequency-to-voltage converter 14, the square wave voltage pulses are differentiated by the capacitor 20 which supplies resulting current pulses to the positive input of the operational amplifier 16. The operational amplifier 16 responds to the current pulses to supply a direct voltage having a magnitude directly proportional to wheel speed.

The speed signal output of the frequency-to-voltage converter 14 from the operational amplifier 16 is applied to the input of a differentiator comprised of a capacitor 28. The capacitor 28 differentiates the speed signal and supplies a current having a magnitude representing the acceleration or deceleration of the wheel as sensed by the speed sensor 10.

The output of the capacitor 28 is coupled to a dual conductance circuit comprised of a resistor 30 parallel coupled with a diode 32. The output of the dual conductance circuit is coupled to a summing junction 34. Current through the differentiating capacitor 28 during wheel acceleration passes through the resistor 30 to provide filtering during wheel acceleration. However, currents through the capacitor 28 during wheel deceleration passes through the diode 32 to provide maximum sensitivity to wheel deceleration.

A deceleration reference generator 35 supplies a deceleration reference signal to the summing junction 34. The deceleration reference signal is comprised of a constant current plus a variable current. The constant current portion of the deceleration reference signal is supplied through a resistor 36 coupled between a voltage source B+ and the summing junction 34. This constant current represents a constant deceleration level. The variable current portion of the deceleration reference signal supplied to the summing junction 34 is supplied by a first order lag circuit comprised of a capacitor 38 and a resistor 40. The charge on the capacitor is referenced to ground and is coupled to the summing junction 34 through the resistor 40. The capacitor 38 is charged by the speed signal at the output of the frequency to voltage converter 14 through a diode 42. A large impedance comprised of a resistor 44 is coupled between the source of a voltage B+ and the capacitor 38 to establish a minimum charge across the capacitor 38.

When the diode 42 is forward biased, the capacitor 38 is quickly charged to the magnitude of the voltage at the output of the frequency to voltage converter 14. When the diode 42 is reverse biased, the capacitor 38 discharges and supplies current to the summing junction 34 at a rate determined by the magnitudes of the capacitor 38 and the resistor 40. The values of the capacitor 38 and the resistor 40 are selected so that the discharge rate of the capacitor 38 when the diode 42 is reverse biased has a slope which is approximately equal to the slope of the vehicle velocity profile when the vehicle is braked on a low coefficient surface and has a slope less than the slope of the vehicle velocity profile when the vehicle is being braked on a high coefficient of friction surface. In this manner, the first order time lag circuit supplies a current to the summing junction 34 which is variable and which has a magnitude varying from actual vehicle speed during anti-lock braking by an amount determined by the road surface coefficient of friction.

The deceleration reference current supplied to the summing junction 34 is summed with the acceleration and deceleration currents supplied through the resistor 30 and the diode 32 respectively.

The output of the summing junction 34 is coupled to a release integrator 46 comprised of an operational amplifier 48 and feedback capacitor 50. A diode 52 is coupled in parallel with the feedback capacitor 50. The output of the summing junction 34 is coupled to the negative input of the operational amplifier 48 through a diode 54. The positive input of the operational amplifier 48 is grounded. The diode 54 inhibits the operational amplifier 48 from sourcing current into the capacitor 28 during wheel deceleration to prevent the bleeding off of deceleration memory. The diode 54 introduces a velocity change threshold, i.e., a required wheel velocity change after the deceleration reference is exceeded by actual wheel deceleration before the integrator 46 begins to integrate. The diode 52 minimizes this velocity change threshold by taking excess current from the diode 54 and the summing junction 34 and minimizing the voltage drop across the diode 54. If the diode 54 is comprised of germanium, for example, which has an inherently low voltage drop, the diode 52 may be eliminated.

The release integrator 46 is responsive to the difference between the wheel deceleration and the deceleration reference as represented by the output of the summing junction 34. The output of the release integrator 46 at the output of the operational amplifier 48 is the integral of the difference between the wheel deceleration and the deceleration reference signal supplied by the deceleration reference generator 35. This output is a velocity error which is the difference between wheel velocity and a reference velocity determined by the deceleration reference. Although the circuit does not produce a signal representing a reference velocity, per se, it does compare a function of a simulated velocity to a function of wheel velocity and operate on a difference to achieve a velocity error signal.

The velocity error signal is coupled to the input of a release comparator 56 through a resistor 58 and a lead circuit comprised of series coupled resistor 60 and capacitor 62. The release comparator 56 switches on at a preset velocity error and switches off at a lower value of velocity error.

The release comparator 56 includes an operational amplifier 64 having a feedback resistor 66 coupled between its output and its positive input and a feedback series circuit comprising resistor 68 and capacitor 70 coupled between its output and its positive input. A constant velocity error reference current is supplied to the negative input of the operational amplifier 64 from the voltage source B+ through a resistor 72. The constant velocity error reference current may represent a velocity error of, for example, 1.5 miles per hour.

When the velocity error signal to the positive input of the operational amplifier 64 exceeds the velocity error reference to the negative input thereof, the operational amplifier 64 shifts its output to a positive voltage level which is amplified by an amplifier 74 whose output controls a brake modulator 76 to effect release of the wheel brake. Conversely, when the velocity error signal input to the positive input of the operational amplifier 64 is less than the velocity error reference, its output shifts to ground potential and the output of the amplifier effects deenergization of the modulator to reapply the wheel brake.

In operation of the circuit described, when the vehicle wheels are not being braked, the capacitor 38 in the deceleration reference generator 35 is charged to the voltage of the speed signal at the output of the frequency-to-voltage converter 14. The deceleration current at the output of the differentiating capacitor 28 is less than the deceleration reference current supplied by the deceleration reference generator. Therefore, the input to the release integrator 46 is a positive current and its output is at ground potential. Consequently, the velocity error signal is zero and the output of the release comparator 56 is ground potential.

When the wheels are braked, a current representing wheel deceleration is supplied through the diode 32 to the summing junction 34. When the wheel deceleration as measured by the magnitude of the current through the differentiating capacitor 28 exceeds the deceleration reference current supplied to the summing junction 34 by the deceleration reference generator 35, the release integrator 46 begins to integrate the difference to provide the velocity error signal. When the velocity error signal represents a velocity error exceeding the velocity error reference supplied to the negative input of the operational amplifier 64, an incipient wheel lock condition exists and the output thereof shifts to a positive voltage level to energize the modulator 76 to effect brake release.

When the vehicle brakes are released, the deceleration of the vehicle wheel decreases to zero and the wheel speed begins to increase toward vehicle speed. The velocity error output of the release integrator 46 decreases accordingly. When the velocity error signal becomes equal to the velocity error reference supplied to the negative input of the operational amplifier 64, representing wheel speed recovery, the output thereof shifts to ground potential to deenergize the modulator 76 to reapply the vehicle brakes. This cycle is continuously repeated during the braking of the vehicle wheel until such time that the wheel deceleration no longer exceeds the deceleration reference supplied to the summing junction 34.

The first order lag circuit comprised of the resistor 40 and the capacitor 38 in the deceleration reference generator 35 provides for adaptive control to compensate for varying coefficients of friction of road surfaces. During braking on low coefficient surfaces, the voltage charge across the capacitor 38 substantially tracks the vehicle velocity so that anti-lock brake cycling can occur down to low vehicle speeds. Conversely, when the vehicle is being braked on high coefficient surfaces, the voltage charge across the capacitor 38 lags behind the vehicle velocity by a magnitude determined by the coefficient of friction of the road surface. Therefore, a larger deceleration reference is provided for a given vehicle velocity for high coefficient surfaces than is provided during braking on low coefficient surfaces. In this manner, the circuit is made adaptive to varying road surface coefficients of friction.

To insure that an incipient lockup condition is present prior to the anti-lock control system being operative to release the brake pressure by energizing the modulator 76, and further to render the anti-lock brake circuit insensitive to wheel speed excursions resulting from axle wrap after each brake application particularly at high speeds on high coefficient roads, the velocity error reference applied to the negative input of the operational amplifier 64 is initially set to a high level, for example, five miles per hour, for the first cycle of anti-lock brake operation and for a short time period following each brake application during anti-lock brake operation. Both of these functions are accomplished by means of an initial cycle and pulser circuit 78 which receives an input from the release comparator 56 and supplies an output current to the negative input of the operational amplifier 64 where it is summed with the constant threshold current supplied through the resistor 72.

The initial cycle and pulser circuit 78 includes an operational amplifier 80 having its positive terminal coupled to the voltage source B+ through a resistor 81 through which it receives a constant reference current. The output of the operational amplifier 80 is coupled to the negative input of the operational amplifier 64 of the release comparator 56 through a resistor 82 and a diode 84. The output of the release comparator 56 is coupled across a capacitor 86 through a diode 88 and resistor 90. The voltage charge across the capacitor 86 is applied to one side of a capacitor 92 through a voltage divider comprised of a resistor 94 and a resistor 96. The other side of the capacitor 92 is coupled to the output of the release comparator 56. The junction between the resistors 94 and 96 is coupled to the negative input of the operational amplifier 80 through a diode 98.

Assuming the output of the release comparator 56 is initially at ground potential, such as prior to anti-lock brake operation, and that the capacitors 86 and 92 are discharged, the output of the operational amplifier 80 is at a positive voltage level. Consequently, a current is supplied through the resistor 82 to the negative input of the differential amplifier 64 where it is summed with the constant current supplied through the resistor 72. At this time, the velocity error threshold is at, for example, five miles per hour and represents the initial cycle threshold.

During braking of the vehicle wheel, when the output of the release integrator 46 represents a velocity error exceeding the velocity error reference supplied by the initial cycle and pulser circuit 78 and by the resistor 72, the release comparator 56 shifts to a positive voltage level to energize the modulator 76 through the amplifier 74 to effect brake release. The voltage shift at the output of the release comparator results in a corresponding shift in the current to the negative input of the operational amplifier 80 which exceeds the current to its positive input through the resistor 81. The operational amplifier 80 then shifts its output to ground potential. Simultaneously, the capacitor 86 begins to charge through the diode 88 and the resistor 90.

When the output of the operational amplifier 80 is shifted to ground potential, the velocity error reference input to the release comparator 56 decreases to the constant reference supplied through the resistor 72. During brake release, the capacitor 86 fully charges and the current to the negative input of the operational amplifier 80 exceeds the current supplied to the positive input through the resistor 81.

When the velocity error signal at the output of the release integrator 46 diminishes to the threshold level supplied through the resistor 72, the output of the release comparator 56 shifts to ground potential to deenergize the modulator 76 to effect vehicle brake application. When the output of the release comparator 56 shifts to ground potential, the voltage at the junction of the resistors 94 and 96 shifts downward to reverse bias the diode 98. At this time, the output of the operational amplifier shifts to a positive voltage level. The capacitor 86 then begins to discharge through the resistors 94 and 96 to charge the capacitor 92. While the diode 98 is reverse biased, the output of the operational amplifier 80 remains at the positive voltage level and the velocity error reference at the negative input of the operational amplifier 64 is at the high reference level. After a time period determined by circuit parameters, the capacitor 92 is charged by the capacitor 86 to forward bias the diode 98. At that time, the operational amplifier 80 output shifts to ground potential to again shift the velocity error reference to the low reference level. The time required to charge the capacitor 92 by the capacitor 86 to the level to forward bias the diode 98 after brake application is of sufficient duration to render the release comparator 56 insensitive to the wheel speed excursions occurring immediately after brake application. This time period may be for example, 100 milliseconds.

The values of the capacitors 86 and 92 and the resistors 94 and 96 are such that the capacitor 86 will maintain the capacitor 92 charged to forward bias the diode 98 for a time period longer than the longest cycle period during anti-lock brake operation. When anti-lock brake operation terminates, the capacitor 86 discharges until the diode 98 again becomes reverse biased and the output of the operational amplifier 80 shifts to a positive voltage level to shift the velocity error reference at the release comparator 56 to its high level for the initial cycle of the next anti-lock brake operation.

In one specific mechanization of the initial cycle and pulser circuit 78, the circuit values were as follows: resistor 81–1.2 M ohms, resistor 90–60 K ohms, resistor 94–300 K ohms, resistor 96–20 K ohms, capacitor 86–4.7 µfd and capacitor 92–.33 µfd.

In one specific mechanization of the deceleration reference generator 35, the circuit values were as follows: resistor 36–3.6 M ohms, resistor 40–360 K ohms, resistor 44–5.1 M ohms and capacitor 38–4.7 µfd. The foregoing values were used with a differentiating capacitor 28 value of 4.7 µfd.

The detailed description of the preferred embodiment of this invention for the purposes of explaining the principles thereof is not to be considered as limiting or restricting the invention since many modifications may be made by the exercise of skill in the art without departing from the scope of the invention.

What is claimed is:
1. An anti-lock system controller for a vehicle with braked wheels, comprising:
   a wheel speed signal generator effective to supply a voltage signal representing wheel speed;
   a summing junction;
   a differentiator coupled between the wheel speed signal generator and the summing junction and effective to differentiate the voltage signal and sup- ply an acceleration signal to the summing junction representing wheel acceleration and deceleration;

a deceleration reference generator effective to supply a deceleration reference signal to the summing junction which represents a reference deceleration, the deceleration reference generator including a direct voltage source, an impedance coupled between the direct voltage source and the summing junction to supply a constant signal representing a constant portion of the deceleration reference signal, and a first order lag circuit coupled between the wheel speed signal generator and the summing junction and effective to supply a variable portion of the deceleration reference signal, the first order lag circuit comprising a storage capacitor, a unidirectional conducting element coupled between the storage capacitor and the wheel speed signal generator and effective to charge the capacitor to a voltage equal to the voltage signal when the voltage charge on the capacitor is less than the voltage signal, and an impedance coupled between the capacitor and the summing junction and effective to discharge the capacitor into the summing junction at a controlled rate, the current through the impedance comprising the variable portion of the deceleration reference signal; and means effective in response to the acceleration signal and the deceleration reference signal by cyclically relieve and apply brake pressure when the acceleration signal and the deceleation reference signal attain predetermined relationships, whereby the variable portion of the deceleration reference signal provides adaptive control for road surfaces of varying coefficients of friction.

2. An anti-lock system controller for a vehicle with braked wheels, comprising:

a wheel speed signal generator effective to supply a voltage signal representing wheel speed;

a differentiator coupled to the wheel speed signal generator and effective to differentiate the voltage signal and supply an acceleration signal representing wheel acceleration and deceleration;

a deceleration reference generator effective to supply a variable deceleration reference signal representing a reference deceleration, the deceleration reference generator including a first order lag circuit, the first order lag circuit comprising a storage capacitor, a first unidirectional conducting element coupled between the storage capacitor and the wheel speed signal generator and effective to couple the voltage signal across the capacitor, and a first impedance coupled to the capacitor and effective discharge the capacitor at a controlled rate, the current through the first impedance comprising a variable portion of the deceleration reference signal;

means effective to cyclically generate a brake release signal; and means effective to relieve brake pressure during each brake release signal and apply brake pressure between consecutive brake release signals to effect anti-lock brake control, the means to cyclically generate a brake release signal including a release integrator effective to generate a velocity error signal which is the integral of the difference between the acceleration signal and the deceleration reference signal when the wheel deceleration represented by the acceleration signal exceeds the reference deceleration, a release comparator effective to generate the brake release signal while the velocity error signal exceeds a velocity error reference, first and second capacitors, a second impedance, a second unidirectional conducting element, means effective to couple the brake release signal across the first capacitor through the second unidirectional conducting element to charge the first capacitor, means effective to couple the charge across the first capacitor to a first side of the second capacitor through the second impedance, means effective to couple the brake release signal to a second side of the second capacitor, and switch means having a control input coupled to the first side of the second capacitor, the switch means being responsive to the voltage at the first side of the second capacitor for supplying a low velocity error reference signal representing a low level of the velocity error reference when the voltage is greater than a predetermined value and for supplying a high velocity error reference signal representing a high level of the velocity error reference when the voltage is below the predetermined value, the second capacitor charging the first capacitor to a voltage equal to the predetermined value a specified time period after termination of each brake release signal, the first capacitor being charged by the release signal by an amount so that the second capacitor is maintained charged by the first capacitor to at least the predetermined voltage level in the absence of a subsequent brake release signal for a time period greater than the longest cycle period of the brake release signal during anti-lock brake operation, whereby the switch means provides a high velocity error reference signal for the first cycle of anti-lock brake operation and provides a momentary high velocity error reference signal for the specified time period after each brake application during anti-lock brake operation.

3. An anti-lock system controller for a vehicle with braked wheels, comprising:

a wheel speed signal generator effective to supply a voltage signal having a value representing wheel speed;

a differentiator coupled to the wheel speed signal generator and effective to differentiate the voltage signal and supply an acceleration signal having a value representing wheel acceleration and deceleration;

a deceleration reference generator effective to supply a variable deceleration reference signal representing a reference deceleration, the deceleration reference generator including a first order lag circuit, the first order lag circuit comprising a storage capacitor, a unidirectional conducting element coupled between the storage capacitor and the wheel speed signal generator effective to charge the capacitor to the value of the voltage signal when the value of the voltage signal exceeds the value of the charge across the capacitor, and an impedance coupled to the capacitor and effective to discharge the capacitor at a controlled rate, the current through the impedance comprising a variable portion of the deceleration reference signal having a value related to the instantaneous value of the charge across the capacitor;

means effective in response to the acceleration signal and the deceleration reference signal to provide a resultant signal representing the algebraic sum of the acceleration signal and the deceleration reference signal; and means effective in response to the resultant signal to cyclically relieve and apply brake pressure when the resultant signal represents the acceleration signal and the deceleration reference signal attaining predetermined relationships, whereby the variable portion of the deceleration reference signal provides adaptive control for road surfaces of varying coefficients of friction.

* * * * *

UNITED STATES PATENT OFFICE
CERTIFICATE OF CORRECTION

Patent No. 4,037,882                    Dated July 26, 1977

Inventor(s) David W. Taylor

It is certified that error appears in the above-identified patent and that said Letters Patent are hereby corrected as shown below:

Column 7, line 28, "by" should be -- to --.

Signed and Sealed this

Second Day of May 1978

[SEAL]

Attest:

RUTH C. MASON
Attesting Officer

LUTRELLE F. PARKER
Acting Commissioner of Patents and Trademarks